US009356859B2

(12) United States Patent
Hanif et al.

(10) Patent No.: US 9,356,859 B2
(45) Date of Patent: May 31, 2016

(54) TECHNIQUES FOR PERFORMING A FAILOVER FROM A PROTECTED CONNECTION TO A BACKUP CONNECTION

(75) Inventors: Mohammad Hanif, Pleasanton, CA (US); Dilip Kumar, Tucson, AZ (US); Minjie Dai, San Jose, CA (US); Lisa Hong Nguyen, San Jose, CA (US); Sundeep Kumar Singh, Bangalore (IN)

(73) Assignee: Brocade Communications Systems, Inc., San Jose, CA (US)

( * ) Notice: Subject to any disclaimer, the term of this patent is extended or adjusted under 35 U.S.C. 154(b) by 280 days.

(21) Appl. No.: 13/585,688

(22) Filed: Aug. 14, 2012

(65) Prior Publication Data

US 2013/0044586 A1 Feb. 21, 2013

Related U.S. Application Data

(60) Provisional application No. 61/524,296, filed on Aug. 16, 2011.

(51) Int. Cl.
*H04L 12/26* (2006.01)
*H04L 12/723* (2013.01)
*H04L 12/707* (2013.01)
*H04L 12/703* (2013.01)

(52) U.S. Cl.
CPC ............... *H04L 45/50* (2013.01); *H04L 45/22* (2013.01); *H04L 45/28* (2013.01)

(58) Field of Classification Search
CPC ..... H04L 12/26; H04L 45/50; H04L 41/0672; H04L 41/0631; H04L 69/40; H04L 45/22; H04L 45/28

USPC .......... 370/218, 216, 217, 223, 351; 709/225, 709/223
See application file for complete search history.

(56) References Cited

U.S. PATENT DOCUMENTS

| 5,251,205 A | 10/1993 | Callon et al. |
| 6,311,288 B1 | 10/2001 | Heeren et al. |
| 6,628,649 B1 | 9/2003 | Raj et al. |
| 6,697,329 B1 | 2/2004 | McAllister et al. |
| 6,711,152 B1 | 3/2004 | Kalmanek, Jr. et al. |
| 6,813,242 B1 | 11/2004 | Haskin et al. |
| 6,882,647 B2 | 4/2005 | McAllister et al. |
| 6,895,441 B1 | 5/2005 | Shabtay et al. |

(Continued)

FOREIGN PATENT DOCUMENTS

WO  WO 03/071745 A1  8/2003

OTHER PUBLICATIONS

Notice of Allowance for U.S. Appl. No. 13/722,534 mailed on Aug. 9, 2013, 9 pages.

(Continued)

*Primary Examiner* — Kwang B Yao
*Assistant Examiner* — Syed M Bokhari
(74) *Attorney, Agent, or Firm* — Kilpatrick Townsend & Stockton LLP

(57) ABSTRACT

Techniques for reducing the latency in performing a failover from a protected connection to its backup connection when a network event is detected affecting the protected connection. In an MPLS network, techniques are provided for failing a protected LSP to a backup LSP in a fast and efficient manner. In one embodiment, the faster failover is facilitated by storing protected LSPs and their backup LSPs information in the data plane, such as locally on a linecard.

21 Claims, 7 Drawing Sheets

(56) References Cited

U.S. PATENT DOCUMENTS

| | | | |
|---|---|---|---|
| 6,904,018 B2 | 6/2005 | Lee et al. | |
| 6,914,912 B1 | 7/2005 | Skalecki et al. | |
| 6,982,951 B2 | 1/2006 | Doverspike et al. | |
| 6,987,727 B2 | 1/2006 | Fredette et al. | |
| 7,058,845 B2 | 6/2006 | Fujita | |
| 7,088,679 B2 | 8/2006 | Behzadi | |
| 7,093,027 B1 | 8/2006 | Shabtay et al. | |
| 7,120,118 B2 | 10/2006 | Rajagopal et al. | |
| 7,133,358 B2 | 11/2006 | Kano | |
| 7,164,652 B2 | 1/2007 | Puppa et al. | |
| 7,180,866 B1 | 2/2007 | Chartre et al. | |
| 7,209,434 B2 | 4/2007 | Kano et al. | |
| 7,230,913 B1 | 6/2007 | Vasseur et al. | |
| 7,233,569 B1 | 6/2007 | Swallow | |
| 7,406,032 B2 | 7/2008 | Li et al. | |
| 7,586,841 B2 | 9/2009 | Vasseur | |
| 7,675,860 B2 | 3/2010 | Vasseur et al. | |
| 8,040,792 B2 | 10/2011 | Hanif et al. | |
| 8,117,503 B1* | 2/2012 | Bishara | H04L 49/552 370/224 |
| 8,358,576 B2 | 1/2013 | Hanif | |
| 8,599,681 B2 | 12/2013 | Hanif | |
| 8,619,550 B2* | 12/2013 | Pan et al. | 370/217 |
| 8,711,676 B2 | 4/2014 | Bhat et al. | |
| 8,830,822 B2 | 9/2014 | Hanif et al. | |
| 2002/0112072 A1 | 8/2002 | Jain | |
| 2003/0063613 A1 | 4/2003 | Carpini et al. | |
| 2003/0090995 A1 | 5/2003 | Illikkal et al. | |
| 2004/0004938 A1 | 1/2004 | Buddhikot et al. | |
| 2004/0109687 A1 | 6/2004 | Park et al. | |
| 2005/0088965 A1 | 4/2005 | Atlas et al. | |
| 2005/0094554 A1 | 5/2005 | Nakash | |
| 2005/0188100 A1 | 8/2005 | Le Roux et al. | |
| 2006/0031490 A1* | 2/2006 | Provine et al. | 709/225 |
| 2006/0067217 A1 | 3/2006 | Li et al. | |
| 2006/0146696 A1 | 7/2006 | Li et al. | |
| 2006/0171316 A1 | 8/2006 | El-Sakkout et al. | |
| 2006/0171320 A1 | 8/2006 | Vasseur et al. | |
| 2007/0011284 A1* | 1/2007 | Le Roux et al. | 709/223 |
| 2007/0038767 A1 | 2/2007 | Miles et al. | |
| 2007/0070883 A1 | 3/2007 | Lysne et al. | |
| 2007/0091795 A1 | 4/2007 | Bonaventure et al. | |
| 2007/0165515 A1 | 7/2007 | Vasseur | |
| 2007/0174483 A1 | 7/2007 | Raj et al. | |
| 2007/0177506 A1 | 8/2007 | Singer et al. | |
| 2008/0049622 A1 | 2/2008 | Previdi et al. | |
| 2008/0219153 A1 | 9/2008 | Shand et al. | |
| 2008/0253281 A1 | 10/2008 | Li et al. | |
| 2009/0292942 A1 | 11/2009 | Bhat et al. | |
| 2009/0292943 A1 | 11/2009 | Hanif et al. | |
| 2010/0106999 A1 | 4/2010 | Hanif | |
| 2011/0075549 A1* | 3/2011 | Lu et al. | 370/216 |
| 2012/0033542 A1 | 2/2012 | Hanif et al. | |

OTHER PUBLICATIONS

Notice of Allowance for U.S. Appl. No. 11/833,167 mailed on Dec. 18, 2013, 19 pages.

Non-Final Office Action for U.S. Appl. No. 13/274,216 mailed on Nov. 8, 2013, 13 pages.

U.S. Appl. No. 14/231,717, filed by Bhat et al. on Mar. 31, 2014, (Unpublished.).

Notice of Allowance for U.S. Appl. No. 13/247,216 mailed on May 5, 2014, 8 pages.

Le Roux et al., "*P2MP MPLS-TE Fast Reroute with P2MP Bypass Tunnels*", draft-ietf-mpls-p2mp-te-bypass-01.txt, Jul. 2007, 14 pages.

Cetin et al., "*Multiprotocol Label Switching (MPLS) Traffic Engineering management Information Base for Fast Reroute*", draft-ietf-mpls-fastreroute-mib-07.txt, Mar. 2007, 35 pages.

Pan et al., RFC 4090: "*Fast Reroute Extensions to RSVP-TE for LSP Tunnels*", May 2005, 36 pages.

"*Dijkstra's Shortest Path Algorithm in Java*", printed from website http://renaud.waldura.com/doc/java/dijkstra, on Jul. 13, 2007, 12 pages.

Wang et el. "*Shortest Path First with Emergency Exits*", Department of Computer Science, University College London, ACM SIGCOMM Computer Communication Review, vol. 20, Issue 4, Sep. 1990, pp. 166-176, 11 pages.

Non-Final Office Action for U.S. Appl. No. 11/833,167, mailed Jun. 24, 2009, 9 pages.

Non-Final Office Action for U.S. Appl. No. 11/833,167, mailed on Feb. 3, 2010, 17 pages.

Final Office Action for U.S. Appl. No. 11/833,167, mailed on Feb. 7, 2011, 19 pages.

Non-Final Office Action for U.S. Appl. No. 11/833,167, mailed on Mar. 28, 2012, 17 pages.

Non-Final Office Action for U.S. Appl. No. 11/833,168, mailed May 13, 2009, 19 pages.

Interview Summary for U.S. Appl. No. 11/833,168, mailed Aug. 25, 2009, 2 pages.

Non-Final Office Action for U.S. Appl. No. 11/833,168, mailed on Dec. 8, 2009, 25 pages.

Final Office Action for U.S. Appl. No. 11/833,168, mailed on Jul. 9, 2010, 29 pages.

Advisory Action for U.S. Appl. No. 11/833,168, mailed on Sep. 28, 2010, 3 pages.

Non-Final Office Action for U.S. Appl. No. 11/833,168, mailed on Feb. 1, 2011, 31 pages.

Notice of Allowance for U.S. Appl. No. 11/833,168, mailed on Jul. 8, 2011, 11 pages.

Non-Final Office Action for U.S. Appl. No. 11/866,861, mailed Oct. 16, 2009, 16 pages.

Final Office Action for U.S. Appl. No. 11/866,861, mailed on Apr. 27, 2010, 9 pages.

Non-Final Office Action for U.S. Appl. No. 11/866,861, mailed on Jul. 27, 2011, 10 pages.

Non-Final Office Action for U.S. Appl. No. 11/866,861, mailed Mar. 29, 2012, 12 pages.

Notice of Allowance for U.S. Appl. No. 11/866,861 mailed Jul. 20, 2012, 8 pages.

Final Office Action for U.S. Appl. No. 11/833,167 mailed Aug. 23, 2012, 16 pages.

Notice of Allowance of U.S. Appl. No. 11/866,861 mailed on Sep. 17, 2012. 6 pages.

Non-Final Office Action for U.S. Appl. No. 13/722,534 mailed on Apr. 25, 2013, 20 pages.

\* cited by examiner

FIG. 3

| Protected LSP Information | | | Backup LSP Information | |
|---|---|---|---|---|
| In-label | Outlabel | Out/Egress I/F | Outlabel | Out/Egress I/F |
| IL1 | OL1 | E2 2/2 | OL2 | E3 2/3 |
| IL2 | OL3 | E2 2/2 | OL4 | E3 2/3 |
| ... | ... | ... | ... | ... |

| Protected LSP Information | | | Backup LSP Information | |
|---|---|---|---|---|
| In-label | Outlabel | Out/Egress I/F | Outlabel | Out/Egress I/F |
| IL1 | OL1 | E2 2/2 | OL2 | E3 2/3 |
| IL2 | OL3 | E2 2/2 | OL4 | E3 2/3 |
| ... | ... | ... | ... | ... |

300 →

| Out/Egress I/F | | |
|---|---|---|
| E2 2/2 | | |

400 →

402

TECHNIQUES FOR PERFORMING A FAILOVER FROM A PROTECTED CONNECTION TO A BACKUP CONNECTION

CROSS-REFERENCES TO RELATED APPLICATIONS

The present application is a non-provisional of and claims the benefit and priority under 35 U.S.C. 119(e) of U.S. Provisional Application No. 61/524,296, filed Aug. 16, 2011, entitled FASTER LOCAL REPAIR FOR TRANSIT FRR RSVP LSPs, the entire contents of which are incorporated herein by reference for all purposes.

BACKGROUND

The present disclosure relates to networking technologies, and more particularly to techniques for reducing the latency in performing a failover from a protected connection to its backup connection when a network event is detected affecting the protected connection.

Connection-oriented protocols such as Multi-Protocol Label Switching (MPLS) are widely used to transport packets across computer networks. MPLS is an example of a label or tag switching protocol that provides a data-carrying mechanism which emulates some properties of a circuit-switched protocol over a packet-switched network. In MPLS, a connection referred to as a label switched path (LSP) is established between two end points and packets are transported along the LSP using label switching. An LSP is unidirectional and represents a tunnel through which data is forwarded across an MPLS network using label/tag switching. Various signaling protocols may be used to set up and manage LSPs. Examples include Resource Reservation Protocol (RSVP) and its various extensions such as RSVP-TE for traffic engineering, and others. RSVP-TE provides a mechanism for reserving resources for LSPs.

Routers that are capable of performing label-based switching according to the MPLS protocol are referred to as label switch routers (LSRs). The entry and exit points of an MPLS network are called label edge routers (LERs). The entry router is referred to as an ingress LER and the exit router as an egress LER. Routers in between the ingress and egress routers are referred to as transit LSRs. LSPs are unidirectional tunnels that enable a packet to be label switched through the MPLS network from an ingress LER to an egress LER.

The flow of packets along an LSP may be disrupted by various network events such as failure of an interface or link along a path traversed by an LSP, failure of a node (e.g., a router) in the LSP path, reduction in bandwidth associated with a link traversed by the LSP, a priority-related event such as when a new high priority LSP comes up and there is bandwidth contention or a change in priority of an existing LSP, which may cause lower priority LSPs to get preempted, and others. To protect against potential data losses caused by such disruptions, a backup LSP may be provisioned for an LSP (referred to as the primary LSP to differentiate it from the backup LSP). The backup LSP provides an alternative path for forwarding packets around a failure point in the primary LSP. Since the primary LSP is "protected" by its corresponding backup LSP, the primary LSP is referred to as a protected LSP.

The Fast ReRoute (FRR) extension to RSVP-TE provides a mechanism for establishing backup LSPs for protecting primary LSPs. The protected LSP is also referred to as an FRR-enabled LSP. When a network event occurs that affects a protected LSP, the packet traffic is locally redirected along the backup LSP in a manner that circumvents the failure point in the protected LSP. When a router starts redirecting data along a backup LSP for a protected LSP, the protected LSP is referred to as being failed over to the backup LSP. FRR enables RSVP to set up a backup LSP to protect an LSP so that in the event of a network failure (e.g., link/node failure), the data traffic from the protected LSP can be switched to the backup LSP to minimize any traffic loss.

A network event may adversely affect multiple LSPs and trigger a failover of these LSPs. The failover operation has to be preferably performed in a timely manner to minimize loss of packets such that the services provided by the affected LSPs are not adversely impacted. This is especially important for real-time applications such as voice services. In many instances, the failover needs to be performed in under 50 msec to make the failover undetectable to the end user. Accordingly, in several instances, it is essential that the data traffic over an LSP not suffer a loss of more than 50 msec in the event of an FRR triggering event.

A network event can trigger the failover of multiple LSPs. This may occur, for example, when an interface used by mutliple LSPs fails. When such an event occurs, the affected LSPs are failed over in a sequential manner. The time needed for failing over multiple LSPs is thus directly proportional to the number of LSPs being failed over. If the number of LSPs being failed over is small, the failover time and data traffic recovery of under 50 msec is generally achievable. However, if the number of LSPs that have to be simultaneously failed over is large, the total recovery time needed for the failover operation can exceed the 50 msec mark. For example, if there are 10K protected LSPs that use a common link. When that common link fails, all the 10K LSPs need to be failed over to their backup LSPs. In doing this, may be the first up to 5K protected LSPs can be switched over to their backup LSPs in 50 msecs but for the rest it takes more than 50 msec. Accordingly, depending upon the number of protected LSPs that need to be failed over, the 50 msec may be exceeded.

In order to reduce the time needed for failovers, in RSVP FRR the backup LSPs are computed and signaled in advance of a failover triggering event. As a result, the time needed to signal and create a backup LSP after the occurrence of a failover triggering event is eliminated. However, in spite of this, the manner in which failovers are handled conventionally by routers is such that it adds significant latency to the failover operation. For example, when a transit LSR along the path of a protected LSP detects a downstream interface/node failure (or other failure events), a control processor of the transit router has to perform extensive RSVP states processing to facilitate failover of the traffic to backup LSPs. Further, the amount of messaging and signaling that takes place within the various components of a router performing the failover also adds to the overall failover processing time. This all leads to increased latency for failovers.

BRIEF SUMMARY

Certain embodiments of the present invention provide techniques for reducing the latency in performing a failover from a protected connection to its backup connection when a network event is detected affecting the protected connection. In one embodiment, in an MPLS network, techniques are provided for failing a protected LSP to a backup LSP in a fast and efficient manner.

In one embodiment, a router comprises a control plane that is separate from a data plane, which may comprise one or more linecards, each with an associated linecard processor. Information identifying a set of protected connections (e.g., protected LSPs) and their corresponding backup connections (e.g., backup LSPs) is stored locally on a linecard. The protected and backup LSPs information is stored prior to occurrence of an event that triggers failovers. When a network event that triggers a failover occurs, a message is sent from the control plane to the linecard and, based upon the message contents and the pre-stored protected and backup LSPs information, the linecard determines a set of LSPs to be failed over and their corresponding backup LSPs. The linecard then causes the failover to occur such that causes the router to redirect data for the failed-over LSPs to be redirected to the backup LSPs.

The network event that triggers failovers may be of different types. In one embodiment, the network event may indicate that an interface is down or has failed. In such an instance, the message communicated from the control plane to the linecard identifies the failed interface. In one embodiment, the failed interface is the failed egress interface. Using the message information and the pre-stored protected and backup LSPs information, the linecard determines the set of protected LSPs to be failed over. The linecard then causes the identified protected LSPs to be failed over to their backup LSPs.

In certain embodiments, information may be stored or organized in a certain manner on the linecard that facilitates identification of the protected LSPs to be failed over and identification of their backup LSPs. For example, a data structure may be stored by the linecard indexed by egress interfaces. Each entry in this data structure may identify an egress interface with each entry pointing to one or more protected LSPs using the egress interface. When a message identifying a failed interface is received by the linecard from the control plane, the linecard may find an entry in the data structure corresponding to the interface identified in the message. The identified entry may then be used to quickly identify one or more protected LSPs that are affected by the failed interface and their backup LSPs. The linecard then causes the identified protected LSPs to be failed over to their backup LSPs.

In certain embodiments, based upon the network event, the control plane may itself determine a list of protected LSPs to be failed over and send the list to the linecard. A single message communicated from the control plane to the linecard can be used to identify multiple protected LSPs to be failed over. For example, if the network event is a reduction in bandwidth on a link, the control plane may first determine a list of LSPs supported by the affected link and then from this list identify a subset of LSPs to be preempted or failed over. In one embodiment, for a bandwidth reduction event, the number of LSPs selected for failover is such that the total bandwidth released as a result of LSPs failover releases sufficient bandwidth to account for the reduction in bandwidth on the link. In one embodiment, the LSPs to be failed over may be identified using their in-labels. Accordingly, a single message sent from the control plane to the linecard can identify multiple in-labels corresponding to protected LSPs to be failed over. Upon receiving the message, the linecard may then perform the failovers.

Another example of a network event that can trigger failovers is a priority-related event such as when a new high priority LSP comes up and there is bandwidth contention or a change in priority of an existing LSP, which may result a lower priority LSP to get preempted. The control plane may determine the lower priority protected LSPs that need to be preempted due to a potential lack of bandwidth (or other resource) caused by the change in priority. A message is then sent from the control plane to the linecard identifying the LSPs to be preempted. The linecard then uses the pre-stored protected and backup LSPs information to cause the protected LSPs identified in the message to be failed over to their corresponding backup LSPs.

The foregoing, together with other features and embodiments will become more apparent upon referring to the following specification, claims, and accompanying drawings

BRIEF DESCRIPTION OF THE DRAWINGS

FIG. 3 depicts an example of a data structure for storing protected and backup LSPs information locally on a linecard to facilitate faster FRR failover processing according to an embodiment of the present invention;

FIG. 4 depicts a data structure that may be provided for facilitating analysis of protected and backup LSPs information stored locally by a linecard according to an embodiment of the present invention;

DETAILED DESCRIPTION

In the following description, for the purposes of explanation, specific details are set forth in order to provide a thorough understanding of certain embodiments of the invention. However, it will be apparent that various embodiments may be practiced without these specific details. The figures and description are not intended to be restrictive.

Certain embodiments of the present invention provide techniques for reducing the latency in performing a failover from a protected connection to its backup connection when a network event is detected affecting the protected connection.

Figure 1:
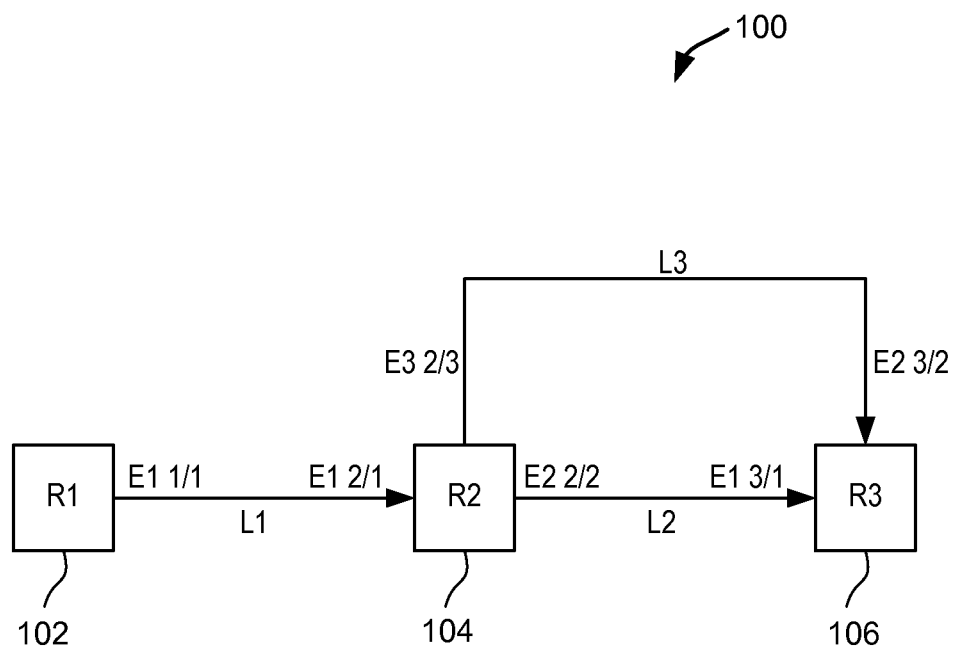
FIG. 1 is a simplified diagram of a network that may incorporate an embodiment of the present invention.

FIG. 1 is a simplified diagram of a network 100 that may incorporate an embodiment of the present invention. For purposes of describing features of embodiments of the present invention, network 100 is assumed to be an MPLS network. This is not intended to be restrictive. As shown, network 100 comprises three routers R1 102, R2 104, and R3 106 that forward packets according to the MPLS protocol. Router R1 102 is connected to router R2 104 via link L1 and router R2 is connected to router R3 via links L2 and L3. A link may be a physical link or a wireless link. Links may have different capacities such as 10/100 megabits-per-second (Mbps), 1 gigabit-per-second (Gbps), 10 Gbps, 100 Gbps, and so on.

In FIG. 1, one or more LSPs may be provisioned from router R1 102 to router R3 106. For example, two separate LSPs may be signaled both having the path R1→L1→R2→L2→R3. A backup LSP may be created for each LSP at router R2 that takes the path R2→L3→R3.

According to FRR, the backup LSPs may be computed and signaled prior to the occurrence of a network event that triggers FRR failover processing. When a network event that adversely impacts the protected LSPs occurs, transit LSR R2 104 may initiate FRR local repair and redirect the data traffic for the protected LSPs to their backup LSPs. For example, if interface E2 2/2, which is used by both protected LSPs, fails or if the bandwidth of link L2 is reduced to the extent that it cannot serve the protected LSPs, transit router R2 104 may perform FRR local repair. As a result of FRR local repair, transit router R2 104 is adapted to redirect the data traffic to the backup LSPs.

According to an embodiment of the present invention, router R2 104 performs the failovers in an optimized manner such that the latency in failing over traffic from a protected connection to its backup connection when a failure is detected affecting the protected connection is reduced. Novel techniques used by certain embodiments of the present invention thus reduce the processing time for performing failovers.

Figure 2:
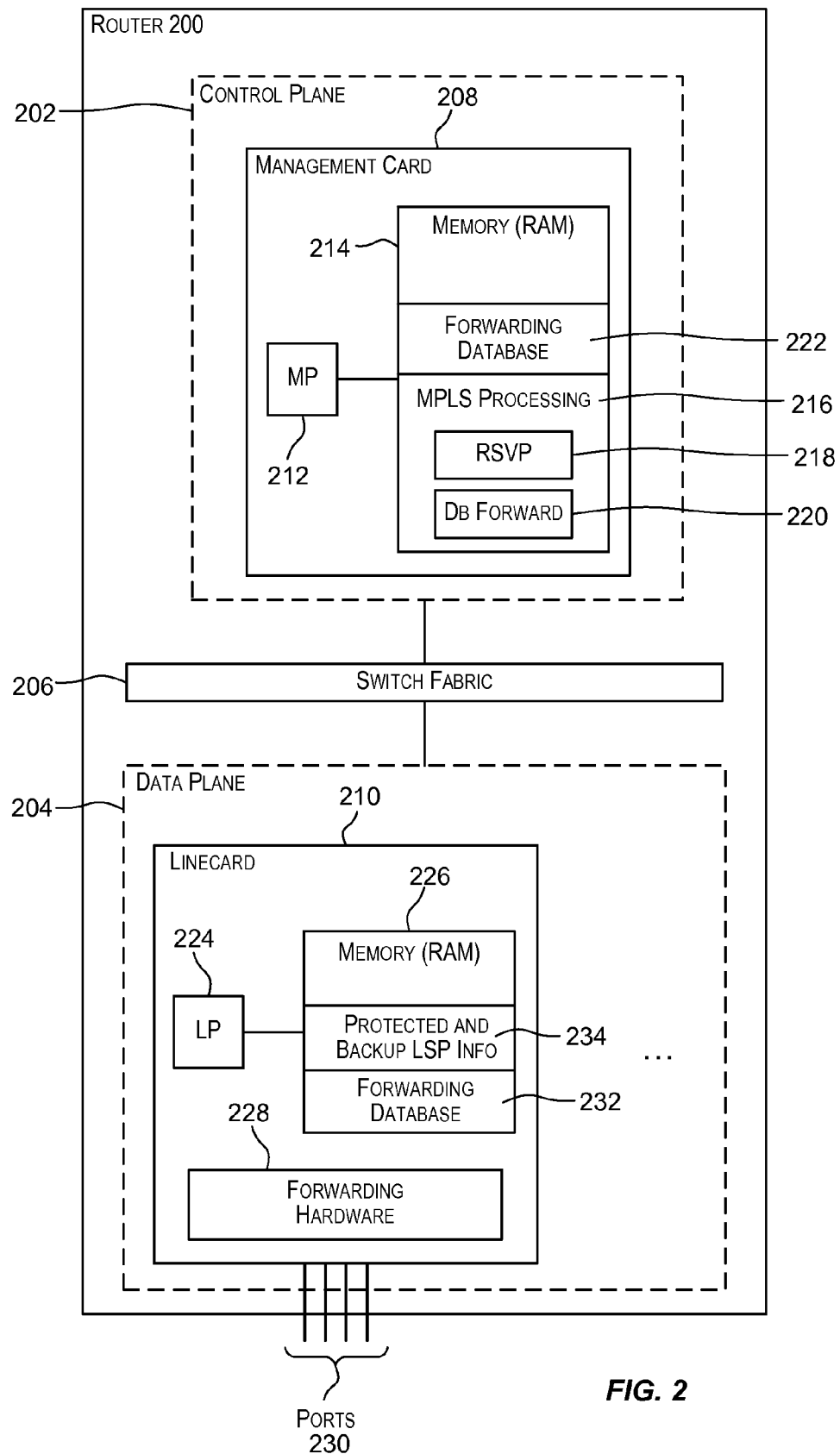
FIG. 2 depicts a simplified block diagram of a router that performs failovers in an optimized manner according to an embodiment of the present invention.

FIG. 2 depicts a simplified block diagram of a router 200 that may be perform failovers in an optimized manner according to an embodiment of the present invention. Examples of routers, such as the one depicted in FIG. 2, that are capable of performing failovers in an optimized manner include routers and other network devices provided by Brocade Communications Systems, Inc. of San Jose, Calif. The components of router 200 depicted in FIG. 2 are meant for illustrative purposes only and are not intended to limit the scope of the invention embodiments in any manner. Alternative embodiments may have more or less components than those shown in FIG. 2.

Router 200 comprises a control plane 202 that is separate from a data plane 204. Control plane 202 may comprise one or more components. Control plane 202 and its components perform management and control functions for router 200. These functions may include performing processing related to control-level network protocols (e.g., RSVP), building and maintaining forwarding information and dynamically updating this information as the network environment changes, managing the data plane and its components, and other control functions. Control plane 202 is responsible for building a forwarding database 222 comprising information that controls routing decisions made by router 200. Control plane 202 is also responsible for receiving and making updates to forwarding database 222 as changes occur in the network environment. In certain embodiments, control plane 202 forwards the information stored in forwarding database 222 to data plane 204. Control plane 202 may be coupled to and communicate with data plane 204 via a switch fabric 206.

In one embodiment, as shown in FIG. 2, control plane 202 may comprise a management card 208 that is adapted to perform management and control functions for router 200. Management card 208 may be communicatively coupled to data plane 204 via switch fabric 206. As shown in FIG. 2, management card 208 may comprise one or more physical processors 212, each referred to as a management processor 212 (also referred to as a control processor or control plane processor). A management processor 212 is typically a general purpose single or multi-core microprocessor such as ones provided by Intel, AMD, ARM, Freescale Semiconductor, Inc., and the like, that operates under the control of software stored in memory 214 associated with management processor 212. In some embodiments, multiple management cards may be provided for redundancy, each management card having one or more management processors.

Memory 214 associated with management processor 212 may be a RAM (e.g., SDRAM). Software (e.g., code, instructions, programs, etc.) executed by management processor 212 may be stored in memory 214. For example, as depicted in FIG. 2, software modules 216 that perform MPLS-related processing may be loaded in memory 214 and executed by management processor 212. Data used by management processor 212 for performing its functions may also be loaded and stored in memory 214. One or more portions of the data used by management processor 212 may also be stored in non-volatile memory storage that can be accessed by management processor 212.

In the embodiment depicted in FIG. 2, MPLS processing modules 216 include an RSVP module 218 and a Database Forwarder (DF) module 220 (also sometimes referred to as Router Label Database Forwarder or RLDF). RSVP module 218, when executed by management processor 212, may cause RSVP-related functions to be performed. For example, RSVP module 218 may be responsible for signaling and setup of LSPs that are used for data forwarding across the MPLS network using label/tag switching. For FRR-enabled LSPs, RSVP module 218 may also be used to setup backup paths for the LSPs so that if events such as link/node failures along the protected LSP occur, the data traffic could be switched to the backup LSP to minimize the traffic loss. The backup LSPs may be pre-signaled and created prior to the occurrence of a network event that triggers FRR failovers. RSVP module 218 may also be responsible for receiving and processing RSVP messages and taking actions in response to the messages. For example, network events indicative of failure of a link or interface, reduction in bandwidth of a link, changes in priorities associated with LSPs, etc. may be received and processed by RSVP module 218. In certain embodiments, the processing due to execution of RSVP module 218 may cause local forwarding database 222 to be built and/or updated.

In certain embodiments, DF module 220 is responsible for forwarding the MPLS forwarding database 222 to data plane 204. DF module 220 thus populates the linecards in data plane 204 with the MPLS database. While DF module 220 is shown as separate from forwarding database 222, in certain embodiments DF module 220 may be a part of database 222. In certain embodiments, DF module 220 facilitates communication between management card 208 and linecards 210. This may include communicating information to the components of data plane 204. In one embodiment, RSVP module 218 may invoke the services of DF module 220 for communicating information to data plane 204 components.

Data plane 204 performs data forwarding functions on packets received by router 200. Data forwarding functions may include receiving packets, determining how the packets are to be forwarded, and forwarding the packets to facilitate communication of the packets to their intended destinations.

Data plane 204 may comprise one or more linecards 210. A linecard 210 may comprise one or more physical processors 224 (referred to as linecard processors), memory 226 (e.g., RAM) associated with each linecard processor, forwarding hardware 228, and one or more ports 230. Software (e.g., code, instructions, programs, etc.) executed by linecard processor 224 and data used by linecard processor 224 for performing its functions may be loaded and stored in memory 226. One or more portions of the data used by linecard processor 224 may also be stored in non-volatile memory storage that can be accessed by linecard processor 224.

Forwarding hardware 228 may comprise various components that are responsible for forwarding packets from router 200. In certain embodiments, forwarding hardware 228 may comprise one or more packet processors coupled to ports 230.

Ports 230 represent the I/O plane for router 200. Router 200 receives and forwards packets using ports 230. A port within ports 230 may be classified as an input port or an output port depending upon whether router 200 receives or transmits a packet using the port. A port over which a data packet is received by router 200 is referred to as an input port. A port used for communicating or forwarding a packet from router 200 is referred to as an output port. A particular port may function both as an input port and an output port. A port may be connected by a link or interface to a neighboring network device such as another router. Ports 230 may be capable of receiving and/or transmitting different types of data traffic at different speeds including 1 Gigabit/sec, 10 Gigabits/sec, 100 Gigabits/sec, or even more. In some embodiments, multiple ports of router 200 may be logically grouped into one or more trunks.

In certain embodiments, a linecard 210 receives forwarding database information from management card 208. A linecard processor 224 on linecard 210 may receive forwarding information from management processor 212. Linecard processor 224 may store the received information as forwarding information 232 in its local memory 226. Linecard processor 224 may then cause forwarding hardware 228 to be programmed using forwarding information 232. In one embodiment, each entry in forwarding database 232 may be programmed into forwarding hardware 228. Forwarding hardware 228 may then forward packets received by router 200 according to the programmed information.

In certain embodiments, upon receiving a packet via an input port, forwarding hardware 228, based upon its programmed information, determines an output port to be used for transmitting the packet from router 200 to facilitate forwarding of the packet to its intended destination. In the case of MPLS, the packets are forwarded using label switching. Within router 200, the packet is then forwarded from the input port to the determined output port and then transmitted from router 200 using the output port. The input and output ports may be on the same linecard or may be on different linecards.

The cards (e.g., management card 208, linecard 210) of a router 200 are sometimes referred to as blades. In one embodiment, router 200 may be a chassis-based system in which the cards can be inserted into one of multiple slots on the chassis. Such an architecture facilitates a modular design that allows for flexible configurations of cards, with different combinations of cards in the various slots of a router according to differing network topologies and switching requirements.

In addition to forwarding database 232, according to certain embodiments, information 234 identifying protected LSPs and their corresponding backup LSPs is stored in data plane 204 prior to the occurrence of a network event that triggers an FRR failover operation. As shown in FIG. 2, the protected and backup LSPs information 234 may be stored locally on linecard 210 in memory 226 associated with linecard processor 224. In one embodiment, management processor 212 generates and communicates the protected LSPs and backup LSPs information to linecard processor 224. The protected LSPs and backup LSPs information is sent to linecard processor 224 prior to occurrence of a failover triggering event. In one embodiment, DF module 220 may be used to communicate the information from management card 208 to linecard 210. Linecard processor 224 may then use this information to perform failovers in an expedited manner, as described below in further detail.

Protected and backup information 234 comprises information that enables linecard processor 224 to determine protected LSPs and their corresponding backup LSPs. In certain embodiments, this information identifies a list of protected LSPs and a backup LSP for each protected LSP. The protected and backup LSPs information may change over time. Management processor 212 determines the changes and communicates these to linecard processor 224, again in advance of an FRR failover triggering event. Linecard processor 224 may then update the locally stored information 234 based upon the changes received from management processor 212. In this manner, the latest and up-to-date information regarding protected LSPs and their backups is stored locally by linecard 210.

FIG. 3 depicts an example of a data structure 300 storing protected and backup LSPs information 234 locally on a linecard to facilitate faster FRR failover processing according to an embodiment of the present invention. For example, data structure 300 may be stored by a linecard of router R2 104 depicted in FIG. 1.

As shown in FIG. 3, data structure 300 comprises information identifying a list of protected LSPs and, for each protected LSP, a corresponding backup LSP. In some alternative embodiments, a list of unprotected LSPs may also be included in data structure 300 and stored locally on a linecard. The information for a protected LSP may include an in-label that uniquely identifies the LSP, an out-label, and an outgoing or egress interface. The in-label for a protected LSP and its backup LSP is the same and accordingly the in-label is only stored once in data structure 300 for each protected and backup LSP pair. The information in data structure 300 may be indexed using the in-label as the primary key. Although data structure 300 is shown as a table in FIG. 3, this is not intended to be restrictive and other data structures may be used in alternative embodiments.

Using the network depicted in FIG. 1 as an example, if data structure 300 were stored by router R2 104, then, as shown in FIG. 3, data structure 300 may comprise two entries identifying the two protected LSPs for router R2. The first protected LSP is identified by an in-label "IL1", an out-label "OL11", and an outgoing or egress interface "E2 2/2". Accordingly, during normal MPLS switching, when router R2 receives a packet having an in-label "IL1", a label operation is performed (e.g., in-label "IL1" is replaced by out-label "OL1" or the out-label "OL1" is pushed onto the packet), and the packet is then forwarded using egress interface E2 2/2. The backup LSP for this protected LSP is identified by the same in-label "IL1", an out-label "OL2", and an egress interface "E3 2/3". Accordingly, as a result of an FRR failover, for a packet with an in-label of "IL1", router R2 performs a label operation using the out-label "OL2" and then forwards the packet using egress interface E3 2/3.

In a similar manner, the second protected LSP is identified by an in-label "IL2", an out-label "OL3", and an egress interface "E2 2/2". During normal MPLS switching, when router R2 receives a packet having an in-label "IL2", a label operation is performed (e.g., in-label "IL2" is replaced by out-label "OL3" or the out-label "OL3" is pushed onto the packet), and the packet is then forwarded using egress interface E2 2/2. It is to be noted that the egress interface for both the protected LSPs is the same and consequently, in the case of failure of the interface, both the protected LSPs will have to be failed over to their corresponding backup LSPs. The backup LSP for the second protected LSP is identified by the same in-label "IL2", an out-label "OL4", and an egress interface "E3 2/3". Accordingly, as a result of an FRR failover, for a packet with an in-label of "IL2", router R2 performs a label operation using out-label "OL4" and then forwards the packet using egress interface E3 2/3.

Although, only two protected LSPs and their corresponding backup LSPs are shown in data structure 300 depicted in FIG. 3, it is to be understood that in alternative embodiments information identifying more or fewer protected LSPs and their backup LSPs may be stored. There can be tens of thousands of such protected LSPs for which information is stored in data structure 300.

The information stored in data structure 300 depicted in FIG. 3 is used by linecard processor 224 on linecard 210 to determine, for each adversely impacted LSP, whether the impacted LSP is a protected LSP, determine a backup LSP for the protected LSP, and then perform failover from the protected LSP to the backup LSP. Further details are provided below.

In order to minimize the time needed by linecard processor 224 to process the information stored in data structure 300 during failover processing, additional data structures may be provided to facilitate the search and analysis of the information stored in data structure 300 by linecard processor 224. Further, information may be stored or organized in a certain manner on the linecard that facilitates identification of the protected LSPs to be failed over and identification of their backup LSPs. For example, as shown in FIG. 4, in certain embodiments, a data structure 400 may be provided that stores a list of unique egress interfaces of the protected LSPs. Each entry in data structure 400 identifies an egress interface used by one or more protected LSPs. The entries in data structure 400 may be indexed using the egress interface as the primary key. For each entry, one or more references 402 are also stored pointing to the one or more protected LSPs that use the egress interface identified by the entry in data structure 400. Since multiple protected LSPs may use the same egress interface, each entry in data structure 400 may point to one or more protected LSPs. For example, in FIG. 4, the entry in data structure 400 identifying egress interface E2 2/2 points to the two protected LSPs stored in information 300.

The use of data structure 400 enables linecard processor 224 on linecard 210 to quickly determine the protected LSPs that use a particular egress interface. Given an egress interface, linecard processor 224 can identify an entry in data structure 400 identifying the particular egress interface and then following references or pointers 402 from that entry to identify the protected LSPs that use the particular egress interface. For example, when a particular interface fails, if information identifying the failed interface is provided to a linecard processor, the linecard processor can use data structures 400 and 300 to determine the protected LSPs impacted by the failed interface in a simple and quick manner. Like data structure 400, other data structures may be provided in alternative embodiments to facilitate expedited search and analysis of information stored in data structure 300 by linecard processor 224.

It is to be noted that the information regarding protected LSPs and their corresponding backup LSPs is communicated from a management card (by the management processor) to a linecard (to a linecard processor) and stored locally on the linecard prior to the occurrence of an event causing an FRR failover. This allows the protected and backup LSPs information to be ready and available for use by the linecard in performing FRR failovers when a failover triggering event occurs. Since the information is available a priori and does not have to be created or obtained by the linecard after the failover triggering event, significant time in performing failovers is saved.

Figure 5:
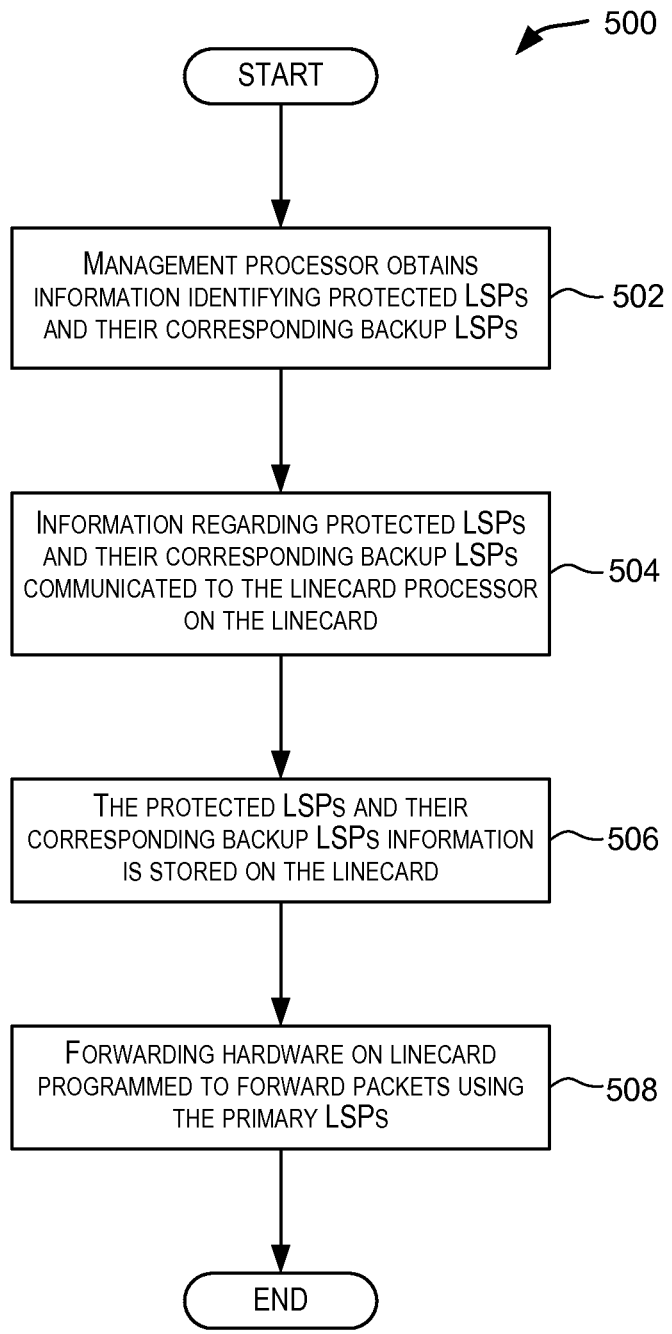
FIG. 5 depicts a simplified flowchart depicting processing performed for storing protected and backup LSPs information on a linecard prior to the occurrence of a failover triggering event according to an embodiment of the present invention.

FIG. 5 depicts a simplified flowchart 500 depicting processing performed for storing protected and backup LSPs information on a linecard prior to the occurrence of a failover triggering event according to an embodiment of the present invention. The processing depicted in FIG. 5 may be implemented in software (e.g., code, instructions, program) executed by one or more processors, hardware, or combinations thereof. In some embodiments, the software may be stored on a non-transitory computer-readable storage medium. The particular series of processing steps depicted in FIG. 5 is not intended to limit the scope of embodiments of the present invention. In one embodiment, portions of the processing depicted in FIG. 5 may be performed by a management processor on a management card and a linecard processor on a linecard.

At 502, a management processor on a management card may obtain information identifying one or more protected LSPs and their corresponding backup LSPs. This information may be received or generated by a management processor using various protocols such as RSVP. For example, RSVP module 218 (in FIG. 2) executed by management processor 212 may be responsible for obtaining and/or configuring this information.

At 504, the management processor on the management card causes the information obtained or generated in 502 to be communicated to a linecard processor on a linecard. Various communication protocols between a management card and a linecard may be used to communicate the information to the linecard. In certain embodiments, an inter-process communication (IPC) technique may be used for communicating information from a management processor on a management card to a linecard processor on a linecard.

In one embodiment, the management processor broadcasts the protected and backup LSPs information to all the linecards in the data plane such that each linecard receives and can store a local copy of the information. A linecard processor on the linecard may then use this information for failover processing in response to the occurrence of a failover triggering event.

At 506, the protected and backup LSPs information received by the linecard is stored locally on the linecard. For example, upon receiving the information from the management processor, the linecard processor on the linecard may store the information in a memory (e.g., RAM 226 depicted in FIG. 2) local to the linecard (e.g., in the form of a data structure 300 depicted in FIG. 3). The linecard processor may also create or update other data structures, such as data structure 400 depicted in FIG. 4, to facilitate expedited use of the information.

At 508, forwarding hardware 228 on the linecard may then be programmed or adapted to forward packets along the primary protected LSPs. For example, the forwarding hardware on a linecard of router R2 may be adapted to, for a packet having an in-label "IL1", perform a label operation using out-label "OL1" and then forward the packet using egress interface E2 2/2. Likewise, the forwarding hardware on a linecard of router R2 may be adapted to, for a packet having an in-label "IL2", perform a label operation using out-label "OL3" and then forward the packet using egress interface E2 2/2.

As depicted in FIG. 5 and described above, information regarding protected LSPs and their corresponding backup LSPs is communicated from the control plane to the data plane in a router and stored at the data plane level prior to the occurrence of an event triggering a failover. This is substantially different from conventional FRR processing, wherein information regarding backup LSPs is only available to the management processor in the control plane and was not stored in the data plane at the linecard level and in some embodiments only made available to the a linecard processor after a failover event occurs for programming the forwarding hardware. As explained below, storing the protected LSPs and backup LSPs information on the linecards enables the runtime failover processing to be performed in a faster manner than in conventional failover processing.

There are various network events that can trigger the failover of one or more LSPs. Examples include the failure of an interface or link, reduction in bandwidth on a link that causes preemption of one or more LSPs supported by that link, a priority-related event such as when a new high priority LSP comes up and there is bandwidth contention or a change in priority of an existing LSP, which may result a lower priority LSP to get preempted, failure of a node (e.g., a router) along the path of an LSP, and the like. At a high level, some of these network events can be classified into two categories: (1) an event that causes all the LSPs on a link to be preempted; and (2) an event that causes a subset of the total LSPs on a link to be preempted.

Figure 6:
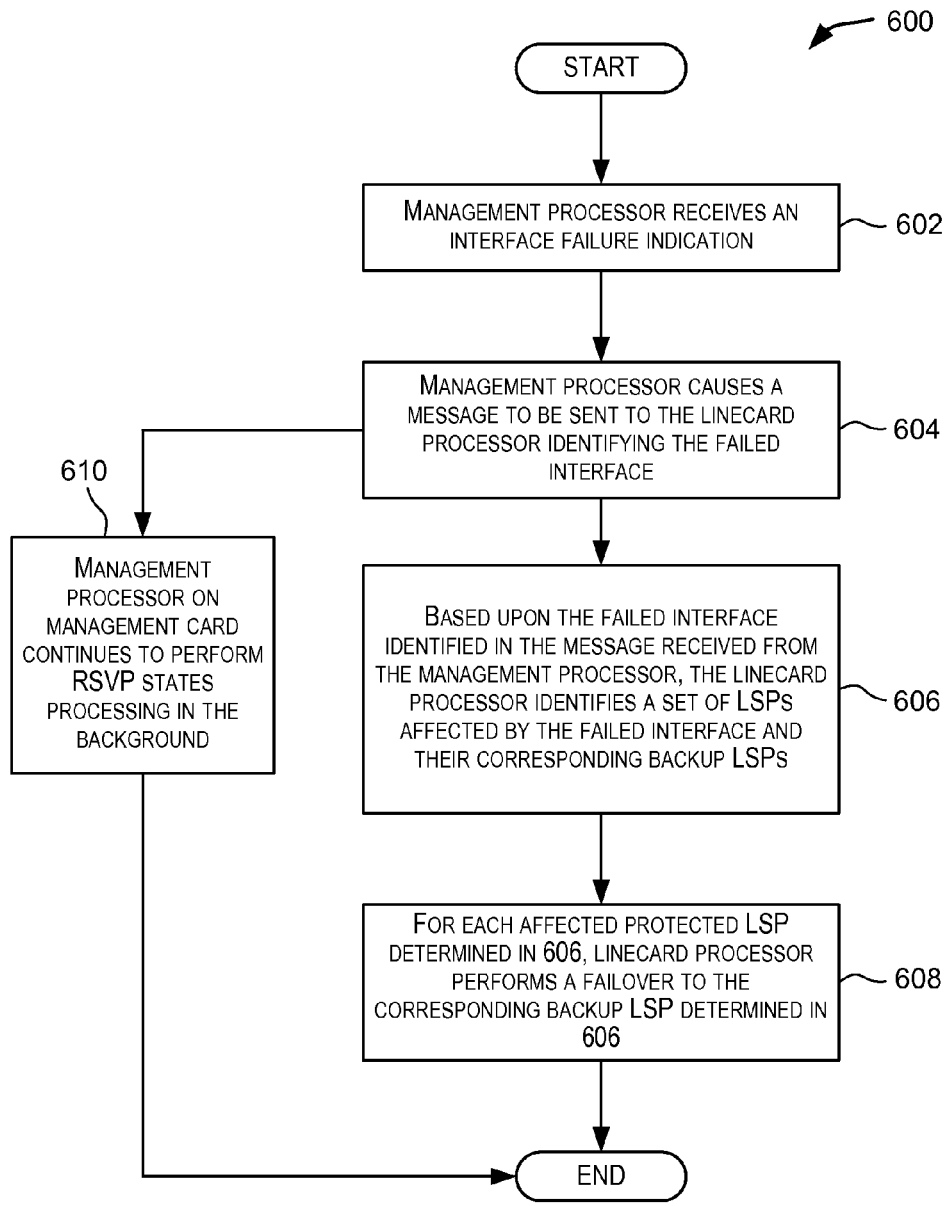
FIG. 6 depicts a simplified flowchart depicting processing performed for failing over one or more protected LSPs in response to an interface or link failure/down network event according to an embodiment of the present invention.

An example of an event falling into category (1) is an interface or link failure/down network event. FIG. 6 depicts a simplified flowchart 600 depicting processing performed for failing over one or more protected LSPs in response to an interface or link failure/down network event according to an embodiment of the present invention. The interface or link failure may be caused by an optical failure on the link, the link being pulled out, etc. The processing depicted in FIG. 6 may be implemented in software (e.g., code, instructions, program) executed by one or more processors, hardware, or combinations thereof. In some embodiments, the software may be stored on a non-transitory computer-readable storage medium. The particular series of processing steps depicted in FIG. 6 is not intended to limit the scope of embodiments of the present invention. In one embodiment, portions of the processing depicted in FIG. 6 may be performed by a management processor on a management card and a linecard processor on a linecard.

At 602, a management processor on a management card may receive an indication of an interface or link failure (e.g., an interface down indication).

At 604, the management processor causes information identifying the failed interface to be communicated to the linecard processor. As part of the processing performed in 604, the management processor may create an IPC message, include information identifying the failed interface in the message, and cause the message to be communicated to the linecard processor on a linecard. The message may indicate, for example, that a particular interface is down or has failed. In certain embodiments, communications from the management card to the linecard may be facilitated by DF module 220, which may generate a message and send the message identifying the failed interface to the linecard processor on the linecard.

At 606, upon receiving the failed interface information from the management processor, the linecard processor uses the pre-stored information regarding protected LSPs and their corresponding backup LSPs to determine a set of the protected LSPs that are adversely impacted by the interface failure and their corresponding backup LSPs. For example, the linecard processor may use data structures 300 and 400 depicted in FIG. 4 to identify the set of protected LSPs that are impacted by the failed interface and the corresponding backup LSPs.

In one embodiment, the linecard processor may identify the set of impacted LSPs and their backup LSPs by first identifying an entry in data structure 400 identifying the particular failed egress interface received from the management processor. The linecard processor may then walk the references or pointers 402 from the identified entry in data structure 400 to identify all the protected LSPs that use the particular egress interface and are thus impacted by the failed interface and their backup LSPs. In this manner, the impacted set of LSPs and their backups are determined in a quick and efficient manner with minimal time impact.

At 608, for each impacted protected LSP that is determined in 606, the linecard processor performs a failover to the corresponding backup LSP determined in 606. In one embodiment, as part of 608, the linecard processor performs the failover from a protected LSP to its backup LSP by programing or adapting the forwarding hardware on the linecard to redirect packets for a protected LSP to the backup LSP for the protected LSP. For example, the forwarding hardware on a linecard of router R2 may be adapted to, for a packet having an in-label "IL1", to perform a label operation using out-label "OL2" and then forward the packet using egress interface E3 2/3. Likewise, the forwarding hardware on a linecard of router R2 may be adapted to, for a packet having an in-label "IL2", to perform a label operation using out-label "OL4" and then forward the packet using egress interface E3 2/3. In one embodiment, the forwarding hardware may be programmed by overwriting the protected LSP information with the backup LSP information.

While the linecard processor is performing 606 and 608, the management processor may, at 610, continue to perform other tasks related to failover processing in parallel with the linecard processor performing tasks 606 and 608. For example, the management processor may continue processing (facilitated by RSVP module 218) of RSVP states relating to the failover. The linecard thus can perform the failovers without having to wait for the management processor to finish its failover-related processing.

Figure 7:
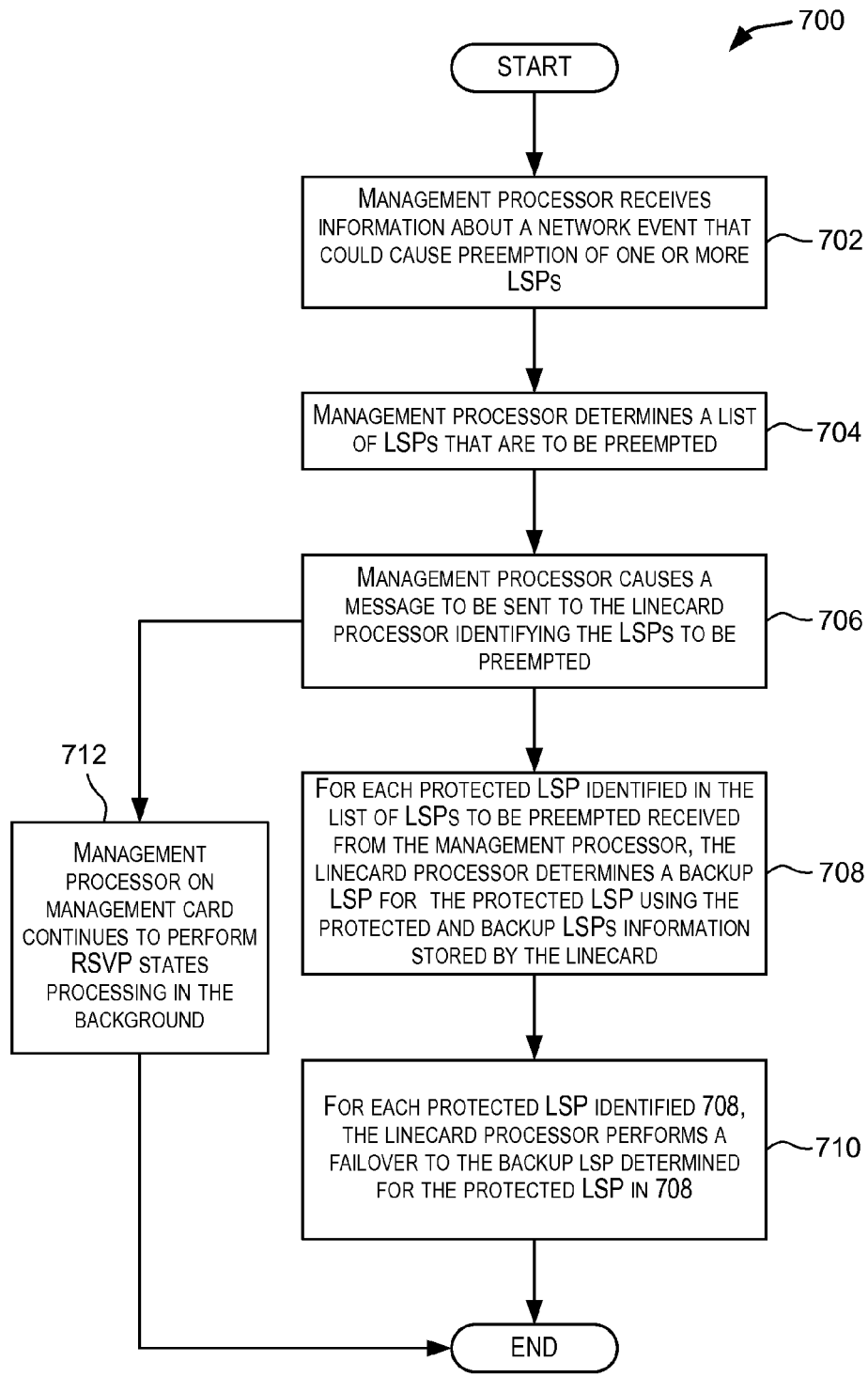
FIG. 7 depicts a simplified flowchart depicting processing performed for failing over a subset of protected LSPs according to an embodiment of the present invention.

As mentioned above, certain network events may cause a subset of the total LSPs supported by a link in an LSP to be failed over. Examples of events that fall into this category include a reduction in bandwidth on a link that causes preemption of one or more LSPs supported by that link, a priority-related event such as when a new high priority LSP comes up and there is bandwidth contention or a change in priority of an existing LSP, which may result a lower priority LSP to get preempted, and others. FIG. 7 depicts a simplified flowchart 700 depicting processing performed for failing over a subset of protected LSPs according to an embodiment of the present invention. The processing depicted in FIG. 7 may be implemented in software (e.g., code, instructions, program) executed by one or more processors, hardware, or combinations thereof. In some embodiments, the software may be stored on a non-transitory computer-readable storage medium. The particular series of processing steps depicted in FIG. 7 is not intended to limit the scope of embodiments of the present invention. In one embodiment, portions of the processing depicted in FIG. 7 may be performed by a management processor on a management card and a linecard processor on a linecard.

At 702, a management processor on a management card may receive an indication of a network event that could cause the preemption or failover of one or more LSPs. For example, the management processor may receive an indication that there has been a reduction in bandwidth on a link. As another example, the management processor may receive an indication that of a priority-related event such as when a new high priority LSP comes up and there is bandwidth contention or a change in priority of an existing LSP, which may result a lower priority LSP to get preempted. In certain embodiments, these indications may be received and processed by RSVP module 218 executed by the management processor.

At 704, the management processor determines a list of LSPs that need to be preempted as a result of the network event determined in 702. The processing in 704 may depend upon the type of network event determined in 702. The event may identify a resource (e.g., bandwidth) that is no longer available and as a result of which one or more LSPs need to be preempted.

For example, if the network event is a reduction in bandwidth on a link, the management processor may first determine a list of LSPs supported by the affected link and then from this list identify a subset of LSPs to be preempted. In one embodiment, for a bandwidth reduction event, the number of LSPs selected for preemption is such that the total bandwidth released as a result of LSPs preemption releases sufficient bandwidth to account for the reduction in bandwidth on the link. In one embodiment, the priority levels of the protected LSPs is also taken into account such that protected LSPs with the lower priorities are selected for preemption before LSPs with higher associates priorities.

For example, assume that link L2 between routers R2 and R3 in FIG. 1 has a bandwidth of 1 Mbps and supports 10K LSPs, each having a bandwidth of 100 bps. If the bandwidth for link L2 falls by half (say to 500 Kbps), the link cannot accommodate 5K of the 10K LSPs and these need to be preempted. If the LSPs to be preempted are FRR-enabled, then these need to be failed over to their corresponding backup LSPs. Accordingly, if the 5K LSPs to be preempted are FRR-enabled, then the 5K LSPs have to be failed over to their backups under FRR.

If the network event determined in 702 is a priority-related event such as when a new high priority LSP comes up and there is bandwidth contention or a change in priority of an existing LSP, which may result a lower priority LSP to get preempted, then the management processor in 704 determines lower priority LSPs that need to be preempted due to a potential lack of bandwidth (or other resource) caused by the change in priority. For example, the network event may indicate that the setup priority for an LSP is higher than the hold priority, which can bump existing LSPs.

Accordingly, based upon the nature of the network event in 702, the management processor determines a list of protected LSPs to be preempted in 704. At 706, the management processor generates and sends a message to the linecard processor identifying the list of LSPs that are determined in 704 to be preempted. As part of the processing performed in 706, the management processor may create an IPC message, include information in the message identifying the list of LSPs to be preempted or failed over, and cause the message to be communicated to the linecard processor on a linecard. In certain embodiments, communications from the management card to the linecard may be facilitated by DF module 220, which may generate a message and send the message to the linecard processor on the linecard.

An LSP may be uniquely identified using its in-label. Accordingly, the list of LSPs to be preempted or failed over can be identified by providing a list of in-labels, with one in-label for each LSP to be preempted. Accordingly, the message (e.g., an IPC message) sent from the management processor to the linecard processor may comprise a list of in-labels, each in-label uniquely identifying a protected LSP to be preempted or failed over. In this manner, a single message communicated from the management processor to the linecard processor can identify multiple LSPs to be failed over. This ability to identify several LSPs to be preempted or failed over using a single message communicated from the management processor to the linecard processor significantly reduces the messaging between the management processor and the linecard processor. This in turn reduces the overall time required to failover multiple LSPs.

At 708, the linecard processor uses the pre-stored protected and backup LSPs information to identify the protected LSPs (e.g., FRR-enables LSPs) from the LSPs identified in the message received from the management processor and, for each such protected LSP, the linecard processor uses the pre-stored information to identify a backup LSP for the protected LSP. As part of the processing in 708, upon receiving the list of LSPs to be preempted from the management processor, the linecard processor determines if the LSP is protected. The linecard processor may use the in-label identifying the LSP to be preempted and the in-label information stored in data structure 300 depicted in FIG. 3 to determine the protected LSPs in the preemption list and their corresponding backup LSPs.

At 710, for each protected LSP identified in 708 from the list of LSPs to be preempted received from the management processor, the linecard processor performs a failover from the protected LSP to the corresponding backup LSP determined in 708. The failover may be performed for each LSP as described above for 608 in FIG. 6 by programming or adapting the forwarding hardware on the linecard to redirect packets for a protected LSP to the backup LSP for the protected LSP. For example, the forwarding hardware on a linecard of router R2 may be adapted to, for a packet having an in-label "IL1", to perform a label operation using out-label "OL2" and then forward the packet using egress interface E3 2/3. Likewise, the forwarding hardware on a linecard of router R2 may be adapted to, for a packet having an in-label "IL2", to perform a label operation using out-label "OL4" and then forward the packet using egress interface E3 2/3.

While the linecard processor is performing 708 and 710, the management processor may, at 712, continue to perform other tasks related to failover processing in parallel with the linecard processor performing tasks 708 and 710. For example, the management processor may continue processing (facilitated by RSVP module 218) of RSVP states relating to the failover. The linecard thus can perform the failovers without having to wait for the management processor to finish its failover-related processing.

The various embodiments described above provide several features that enable the embodiments to perform FRR failovers faster than conventional failover processing methods. For example, by storing information related to protected LSPs and their corresponding backup LSPs at the linecard level (i.e., at the data plane level), the various tasks involved in failing over the LSPs can be more evenly distributed between the control plane and the data plane. Further, several of these tasks can now be performed in parallel between the management processor and the linecard processor instead of performing tasks in a sequential manner as done by conventional failover techniques. For example, the linecard processor can perform failovers while the management processor is processing RSVP states. The linecard processor thus can perform the failovers without having to wait for the management processor to finish its failover-related processing. This parallelism significantly reduces the overall time needed for performing the LSP failovers.

Further, the protected and backup LSP information is downloaded and stored on a linecard prior to and ahead of the time of occurrence of a failover triggering event. Accordingly, when a failover event occurs, time is not wasted either in creating and/or downloading the information at that time to the linecard.

Additionally, the number of messages that are exchanged between the control plane and the data plane for performing multiple failovers triggered by an event, including inter-process and inter-processor messages, is dramatically reduced according to embodiments of the present invention. This further reduces the time needed to perform the failovers. For example, as described above for FIG. 6, when an interface fails, a single message is communicated in 604 from the control plane to the data plane (from a management processor on a management card to a linecard processor on a linecard) identifying the failed interface. The linecard processor on the linecard then uses this information and the pre-stored protected and backup LSPs information to identify protected LSPs to be failed over and their corresponding backup LSPs. The linecard processor on the linecard then performs the failovers. Along the same lines, as described above for FIG. 7, a single message communicated from a management processor to the linecard processor may be used to identify multiple LSPs to be preempted or failed over. The LSPs to be preempted or failed over may simply be identified using their in-labels. Accordingly, even when multiple LSPs are to be failed over, a single message may be used to communicate the information from the control plane to the data plane. This is significantly different from conventional failover techniques that require multiple separate messages to be communicated from the control plane to the data plane for each affected LSP. This is because, in conventional techniques, the protected and backup LSPs information is only available to the control plane management processor. In conventional methods, when an interface fails, the management processor in the control plane determines the impacted LSPs, and then for each impacted LSP, has to send one or even multiple messages to the linecard processor in the data plane to perform failover for the impacted LSP. As a result of this, when multiple LSPs are being failed over in conventional implementations, a large number of messages and signals have to be communicated between the control plane and the data plane, which translates to increased use of processing resources on the router for processing the messages. Consequently, as the number of LSPs to be failed over becomes large, this increased messaging significantly bogs down the router performance and increases the overall time needed to accomplish failovers for all the impacted LSPs. In contrast, embodiments of the present invention significantly simplify and reduce the number of messages that are communicated from the management processor to a linecard processor when an FRR reroute is to be performed for multiple LSPs. A single message sent from the control plane to the data plane can effectuate failovers of multiple LSPs at the data plane level. As a result of the significantly reduced messaging, minimal processing is required to be performed in the control plane, which in turn enables a quick failover to backup LSPs, resulting in minimal traffic loss and faster FRR convergence time for a large number of LSPs.

Embodiments of the present invention thus reduce the latency for performing FRR failovers. For a certain number of protected LSPs to be failed over, embodiments of the present invention can perform the failovers much faster than conventional failover methods thereby facilitating faster FRR convergence. From a time perspective, for a particular quanta of time (e.g., 1 second, 50 msecs, etc.), the total number of LSPs that can be failed over by certain embodiments of the present invention is far greater than the number that can be failed over using conventional failover methods.

In certain embodiments, the processing time for performing failovers is further reduced by differentiating between LSPs that are FRR-enabled (i.e., protected LSP) and those that are not (i.e., not protected). In one embodiment, the protected LSPs are processed before processing the non-protected LSPs. In this embodiment, the LSPs that are impacted by a network event may be grouped into protected LSPs and non-protected LSPs and the protected LSPs are processed before the non-protected LSPs.

The time savings provided by embodiments of the present invention are further illustrated by the observed test data shown in Table A.

TABLE A

| # of LSPs | Time needed for failovers by an invention embodiment (in msec) | Time needed for failovers by a prior art method (in msec) |
| --- | --- | --- |
| 1000 | 1.9 | 789 |
| 4000 | 29.3 | 3171 |
| 8000 | 102.3 | 5904 |
| 12000 | 140.9 | Did not converge/data not available |
| 16000 | 186.3 | Did not converge/data not available |
| 20000 | 222.6 | Did not converge/data not available |

In Table A, the first column identifies that total number of protected LSPs that were failed over due to a network event. The second column indicates the total time (in msec) needed for failing over the number of protected LSPs identified in the first column by an embodiment of the present invention. The third column indicates the total time (in msec) needed for failing over the number of protected LSPs identified in the first column using a conventional prior art method. As can be clearly seen from Table A, embodiments of the present invention offer significant time savings for performing failovers for multiple LSPs when compared to prior art techniques. As seen in Table A, an embodiment of the present invention provides for sub-second FRR convergence for a large number of LSPs.

Figure 8:
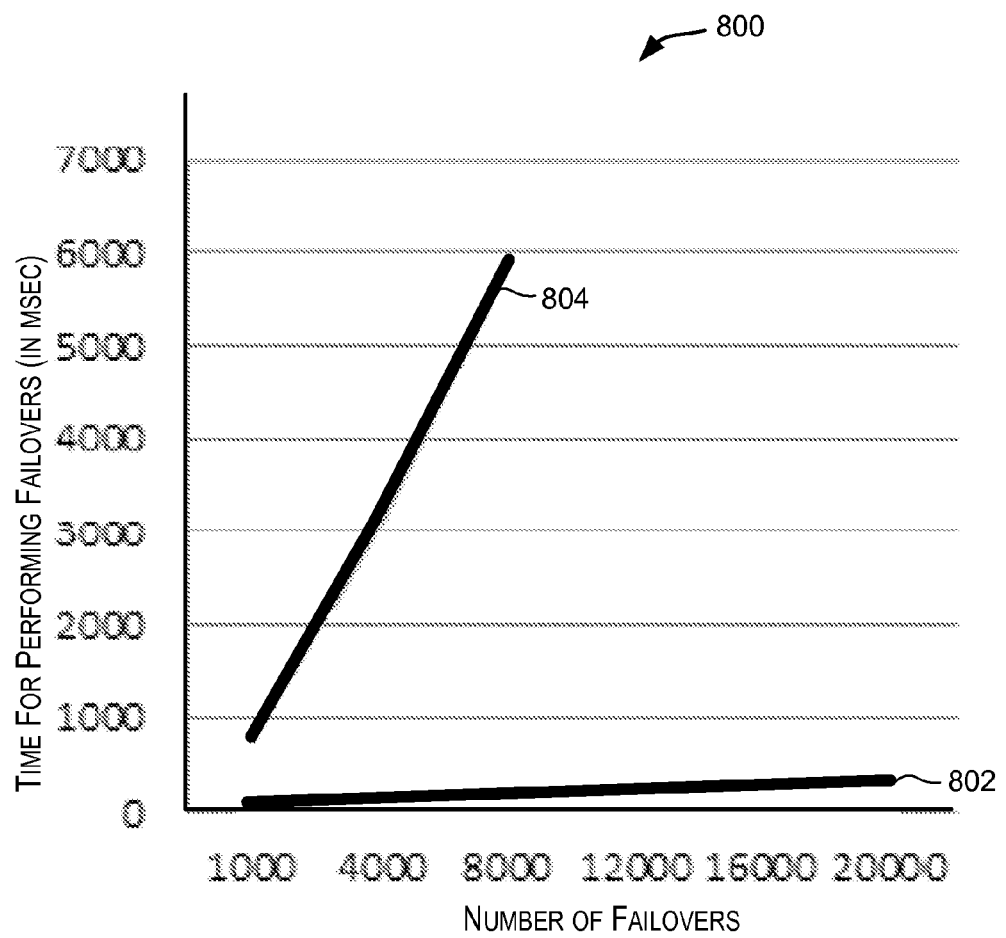
FIG. 8 depicts a graph showing an example of comparison of failover times according to an embodiment of the present invention and a conventional prior art failover technique.

FIG. 8 depicts a graph 800 showing an example of comparison of failover times according to an embodiment of the present invention and a conventional prior art failover technique. The number of LSPs that are being simultaneously repaired or failed is indicated in the X-axis of graph 800. The time (in msec) taken to complete the local repair failovers is represented along the Y-axis of graph 800. Line 802 represents results obtained from using an embodiment of the present invention. Line 804 represents results obtained from using a conventional prior art technique. As is evident from graph 800, an embodiment of the present invention significantly improves the FRR failover time by many folds.

The various processing embodiments described above, including the processing depicted in the flowcharts in FIGS. 5, 6, and 7 can be performed in software without needing changes to existing router hardware, thereby increasing the economic viability of the solution. Since inventive embodiments can be implemented entirely in software, it allows for quick rollouts or turnarounds along with lesser capital investment, which further increases the economic viability and attractiveness of the solution.

Various embodiments described above can be realized using any combination of dedicated components and/or programmable processors and/or other programmable devices. The various embodiments may be implemented only in hardware, or only in software, or using combinations thereof. The various processes described herein can be implemented on the same processor or different processors in any combination, with each processor having one or more cores. Accordingly, where components or modules are described as being adapted to or configured to perform a certain operation, such configuration can be accomplished, e.g., by designing electronic circuits to perform the operation, by programming programmable electronic circuits (such as microprocessors) to perform the operation, by providing software or code instructions that are executable by the component or module (e.g., one or more processors) to perform the operation, or any combination thereof. Processes can communicate using a variety of techniques including but not limited to conventional techniques for interprocess communication, and different pairs of processes may use different techniques, or the same pair of processes may use different techniques at different times. Further, while the embodiments described above may make reference to specific hardware and software components, those skilled in the art will appreciate that different combinations of hardware and/or software components may also be used and that particular operations described as being implemented in hardware might also be implemented in software or vice versa.

The various embodiments are not restricted to operation within certain specific data processing environments, but are free to operate within a plurality of data processing environments. Additionally, although embodiments have been described using a particular series of transactions, this is not intended to be limiting.

Thus, although specific invention embodiments have been described, these are not intended to be limiting. Various modifications and equivalents are within the scope of the following claims.

What is claimed is:

1. A router comprising:
   a control plane; and
   a data plane comprising a linecard;
   wherein the linecard is adapted to:
      store information identifying a plurality of protected connections and a backup connection for each protected connection in the plurality of protected connections, wherein the information is received by the linecard prior to the occurrence of a network event;
      receive a message from the control plane, the message generated by the control plane upon the occurrence of the network event;
      determine, based upon the message and the stored information, a set of protected connections from among the plurality of protected connections, the set of protected connections including multiple connections to be failed over; and
      for each connection from the set of protected connections:
         determine, based upon the stored information, a backup connection for the protected connection; and
         perform a failover for the protected connection to the determined backup connection.

2. The router of claim 1 wherein the plurality of protected connections comprises protected label switched paths (LSPs).

3. The router of claim 1 wherein:
   the network event indicates that an interface has failed; and
   information identifying the interface is included in the message sent to the linecard.

4. The router of claim 3 wherein the linecard is adapted to:
   identify the set of protected connections to include protected connections from the plurality of protected connections that use the interface identified in the message, wherein the identified interface is as an egress interface.

5. The router of claim 3 wherein the linecard is adapted to:
   determine, from a data structure storing information about a plurality of egress interfaces, a first entry corresponding to the interface identified in the message received from the control plane; and
   determine the set of protected connections to be failed over using the first entry.

6. The router of claim 1 wherein the control plane is adapted to:
   determine two or more protected connections to be failed over due to the network event;
   include, in the message sent to the linecard, information identifying each of the two or more protected connections.

7. The router of claim 6 wherein:
   each of the two or more protected connections is a protected label switched path (LSP); and
   the message comprises an in-label for each of the two or more protected connections.

8. The router of claim 6 wherein:
   the network event indicates a reduction in bandwidth on a link; and
   the control plane is adapted to determine the two or more protected connections to be failed over from connections supported by the link.

9. The router of claim 6 wherein:
   the network event indicates a priority-related event for a first connection; and
   the control plane is adapted to determine the two or more protected connections to be failed over based on the priority-related event for the first connection.

10. A method comprising:
    storing, by a linecard in a router, information identifying a plurality of protected connections and a backup connection for each protected connection in the plurality of protected connections, wherein the information is received by the linecard prior to the occurrence of a network event;
    sending, by a control plane in the router, a message to the linecard in the router, the message generated by control plane upon the occurrence of the network event; and
    upon the linecard receiving the message from the control plane:
       determining, by the linecard, based upon the message and the stored information, a set of protected connections from among the plurality of protected connections, the set of protected connections including connections to be failed over; and
       for each connection from set of protected connections:
          determining, by the linecard, based upon the stored information, a backup connection for the protected connection; and
          performing, by the linecard, a failover for the protected connection to the determined backup connection.

11. The method of claim 10 wherein the plurality of protected connections comprises protected label switched paths (LSPs).

12. The method of claim 10 wherein the network event indicates that an interface has failed, the method further comprising;
    including, by the control plane, information identifying the interface in the message sent to the linecard.

13. The method of claim 12 wherein determining the set of protected connections comprises:
    identifying the set of protected connections to include protected connections from the plurality of protected connections that use the interface identified in the message, wherein the identified interface is as an egress interface.

14. The method of claim 12 wherein determining the set of protected connections comprises:
   determining, from a data structure storing information about a plurality of egress interfaces, a first entry matching the interface identified in the message received from the control plane; and
   determining the set of protected connections to be failed over using the first entry.

15. The method of claim 10 wherein:
   determining, by the control plane, two or more protected connections to be failed over due to the network event; and
   sending the message to the linecard comprises including in the message, by the control plane, information identifying each of the two or more protected connections.

16. The method of claim 15 wherein:
   each of the two or more connections is a protected label switched path (LSP); and
   the message comprises an in-label for each of the two or more protected connections.

17. The method of claim 15 wherein the network event indicates a reduction in bandwidth on a link, the method further comprising:
   determining, by the control plane, the two or more protected connections to be failed over from connections supported by the link.

18. The method of claim 15 wherein the network event indicates a priority-related event for a first connection, the method further comprising:
   determining, by the control plane, the two or more protected connections to be failed over based on the priority-related event for the first connection.

19. A computer-readable memory storing a plurality of instructions for controlling a router device, the plurality of instructions comprising:
   instructions that cause a linecard in the router device to store information identifying a plurality of protected connections and a backup connection for each protected connection in the plurality of protected connections, wherein the information is received by the linecard prior to the occurrence of a network event;
   instructions that cause a control plane in the router device to send a message to the linecard in the router device, the message generated by the control plane upon the occurrence of the network event;
   upon the linecard receiving the message from the control plane, instructions that cause the linecard to:
      determine, based upon the message and the stored information, a set of protected connections from among the plurality of protected connections, the set of protected connections including connections to be failed over; and
      for each connection from the set of protected connections, instructions that cause the linecard to:
         determine, based upon the stored information, a backup connection for the protected connection; and
         perform a failover for the protected connection to the determined backup connection.

20. The computer-readable memory of claim 19 wherein the network event indicates that an interface has failed, and wherein the plurality of instructions further comprise instructions that cause the linecard to determine the set of protected connections to include protected connections from the plurality of protected connections that use the interface identified in the message, wherein the identified interface is an egress interface.

21. The computer-readable memory of claim 19 wherein the message sent to the linecard identifies two or more protected connections to be failed over.

* * * * *